United States Patent [19]
Kondoh et al.

[11] Patent Number: 5,767,026
[45] Date of Patent: Jun. 16, 1998

[54] SILICON NITRIDE CERAMIC AND PROCESS FOR FORMING THE SAME

[75] Inventors: Naoki Kondoh, Aichi; Fumihiro Wakai, Gifu; Yoshihiro Obata, Aichi; Akira Yamakawa, Hyogo; Takao Nishioka, Hyogo; Masashi Yoshimura, Hyogo, all of Japan

[73] Assignees: Agency of Industrial Science and Technology; Sumitomo Electric Industries, Ltd., both of Japan

[21] Appl. No.: 633,797
[22] PCT Filed: Oct. 4, 1995
[86] PCT No.: PCT/JP95/02026
 § 371 Date: Apr. 10, 1996
 § 102(e) Date: Apr. 10, 1996
[87] PCT Pub. No.: WO96/10546
 PCT Pub. Date: Apr. 11, 1996

[30] Foreign Application Priority Data

Oct. 4, 1994 [JP] Japan ................... 6-264576

[51] Int. Cl.$^6$ ............... C04B 35/584; C04B 35/599
[52] U.S. Cl. ............ 501/97.1; 501/97.2; 501/97.3; 501/98.1; 501/98.2; 264/665; 264/683
[58] Field of Search ................. 501/97, 98, 97.1, 501/97.2, 97.3, 98.1, 98.2; 264/665, 683

[56] References Cited

U.S. PATENT DOCUMENTS

| | | | |
|---|---|---|---|
| 5,204,297 | 4/1993 | Yamamoto et al. | 501/97 |
| 5,275,772 | 1/1994 | Yamamoto et al. | 501/97 |
| 5,275,986 | 1/1994 | Yamamoto et al. | 501/97 |
| 5,369,065 | 11/1994 | Yoshimura et al. | 501/97 |
| 5,384,292 | 1/1995 | Matsui et al. | 501/97 |
| 5,394,015 | 2/1995 | Tsuzuki et al. | 501/97 |
| 5,424,256 | 6/1995 | Yoshimura et al. | 501/98 |
| 5,502,011 | 3/1996 | Yamamoto et al. | 501/98 |
| 5,523,267 | 6/1996 | Tanaka et al. | 501/98 |
| 5,556,815 | 9/1996 | Boberski et al. | 501/98 |

FOREIGN PATENT DOCUMENTS 62-278169 12/1987 Japan.
3-197003 8/1991 Japan.

*Primary Examiner*—Karl Group
*Attorney, Agent, or Firm*—Bierman, Muserlian and Lucas

[57] ABSTRACT

There are provided a process for forming a silicon nitride sintered body, encompassing a sialon sintered body, by making much of the superplasticity of the sintered body intact as a simple material without formation thereof into a composite material, and a formed sintered body produced by the foregoing process. A silicon nitride sintered body (encompassing a sialon sintered body) having a relative density of at least 95% and a linear density of 120 to 250 in terms of the number of grains per 50 μm in length in a two-dimensional cross section of the sintered body is formed through plastic deformation thereof at a strain rate of at most $10^{-1}$/sec under a tensile or compressive pressure at a temperature of 1,300 to 1,700° C. The formed sintered body has a degree of orientation of 5 to 80% as examined according to a method specified by Saltykov, a linear density of 80 to 200, and excellent mechanical properties especially at ordinary temperatures.

8 Claims, 1 Drawing Sheet

SILICON NITRIDE CERAMIC AND PROCESS FOR FORMING THE SAME

TECHNICAL FIELD

The present invention relates to a silicon nitride (encompassing "sialon") ceramic excellent in mechanical properties especially at ordinary temperatures which ceramic can be obtained by applying superplastic deformation to a silicon nitride (encompassing "sialon") sintered body applicable to machine parts including a valve train of an internal combustion engine, and a process for forming a silicon nitride ceramic according to which process a silicon nitride sintered body can be formed into a desired shape through superplastic deformation thereof.

BACKGROUND ART

For the purpose of attaining lighter weights and miniaturization of machine parts including a valve train of an internal combustion engine as well as improving the durability thereof, there have recently been attempts to use ceramic materials excellent in abrasion resistance and sliding properties as materials of parts. Among such ceramics, silicon nitride ($Si_3N_4$, encompassing "sialon") ceramics have attracted particular attention because of their light weights and high strengths.

In order to put silicon nitride ceramics into practical use as parts of a valve train, etc., however, there is need for not only an improvement in the mechanical strengths of the materials thereof but also development of a forming process excellent in aspects of productivity and cost.

Specifically, since silicon nitride is such a brittle material as to be extremely poor in processability, a method wherein a starting powder material is molded according to casting, molding with a mold, injection molding or the like, and then sintered is adopted for production of a complicatedly shaped article. Since shrinkage is involved in sintering according to the foregoing method, however, subsequent mechanical working such as cutting, grinding and/or polishing is necessary in the field where an accuracy is required, whereby an increase in production cost is incurred to become a hindrance to mass production.

On the other hand, plastic working of some kinds of ceramics through utilization of superplasticity thereof has recently attracted attention. For example, Japanese Patent Publication No. 5,282/1991 proposes a forming process wherein the superplasticity of an oxide ceramic (especially $ZrO_2$) is utilized. On the other hand, Japanese Patent Laid-Open No. 197,003/1991 discloses that a silicon nitride-silicon carbide composite sintered body having fine and isometric grains can be formed at controlled temperature and strain rate by virtue of the superplasticity thereof.

In such plastic working through utilization of superplasticity, a ceramic material can be formed into a predetermined shape with a good accuracy, without any conventional mechanical working step, to attain mass production with a good productivity. However, the present status of art is that oxide ceramics such as $ZrO_2$ account for an overwhelming majority of ceramic materials capable of exhibiting superplastic deformation, while only composite materials containing at least two kinds of non-oxide ceramics, such as $Si_3N_4$—SiC ceramics, have been reported as non-oxide ceramic materials.

Since there are no examples of silicon compound ceramics capable of superplastic deformation except for peculiar composite materials containing two mutually different silicon compounds ($Si_3N_4$—SiC) as described above, there has been a demand for materialization of a simple silicon nitride (encompassing "sialon") ceramic capable of superplastic deformation.

Under the foregoing circumstances of prior art, an object of the present invention is to find simple sintered bodies of silicon nitride and sialon capable of exhibiting superplastic deformation as has hitherto been unknown, provide a forming process wherein the superplastic deformation thereof is utilized, and provide a silicon nitride ceramic, which may be a sialon ceramic, formed by the foregoing forming process and having excellent mechanical properties especially at ordinary temperatures.

DISCLOSURE OF INVENTION

In order to attain the foregoing object, the present invention provides a process for forming a silicon nitride as well as sialon ceramic, characterized in that a silicon nitride sintered body as well as a sialon sintered body) having a relative density of at least 95% and a linear density of 120 to 250 in terms of the number of grains per 50 μm in length in a two-dimensional cross section of the sintered body is formed through plastic deformation thereof at a strain rate of at most $10^{-1}$/sec by a tensile or compressive pressure at a temperature of 1,300° to 1,700° C.

The silicon nitride ceramic and the sialon ceramic of the present invention obtained according to the foregoing process are characterized in that the degree of orientation of the texture thereof on a two-dimensional cross section of the formed sintered body thereof in a direction parallel to the axial direction of tension or compression in the forming step is in the range of 5 to 80% as examined according to a method specified by Saltykov, and in that the linear density of grains per 50 μm in length in a direction parallel to the axial direction of tension or perpendicular to the axial direction of compression in the above-mentioned two-dimensional cross section is 80 to 200.

Additionally stated, in the description of the instant application, the term "silicon nitride ceramic," even where simply so mentioned, is intended to encompass a sialon ceramic, while the term "silicon nitride sintered body" or "$Si_3N_4$ sintered body," even where simply so mentioned, is intended to encompass a sialon sintered body.

As a result of intensive investigations with a view to enabling superplastic forming of a silicon nitride sintered body (encompassing a sialon sintered body) comprising silicon nitride in particular as the main component and a sintering aid indispensable for sintering, the inventors of the present invention have found out that a sintered body having fine grains including prismatic grains can exhibit a great ductility, i.e., superplasticity, without necking in a monoaxial tensile test at controlled temperature and strain rate.

A silicon nitride sintered body (encompassing a sialon sintered body) formed according to the forming process of the present invention has the texture thereof oriented in a direction parallel to the axial direction of tension or compression in the forming step because it is subjected to superplastic working. The degree of orientation is represented by the following formula according to the method specified by Saltykov:

$$\omega = 100 \times \{(NL)\perp - (NL)\|\} / \{(NL)\perp + 0.571 \times (NL)\|\}$$

wherein the unit of ω is percent.

$(NL)\perp$ is the average number of points of intersection of a secant line perpendicular to the axis of tension with lines of grain boundaries per unit length, or the average number of points of intersection of a secant line parallel to the axis of compression with lines of grain boundaries per unit length, while (NL)∥ is the average number of points of intersection of a secant line parallel to the axis of tension with lines of grain boundaries per unit length, or the average number of points of intersection of a secant line perpendicular to the axis of compression with lines of grain boundaries per unit length.

The method of examining the above-mentioned degree of orientation is well known, and the details thereof are described in "Keiryo-Keitaigaku (QUANTITATIVE MICROSCPY)," translated by Makishima et al. and published by Uchida Rokaku Ho, 1983, page 131.

In the formed silicon nitride sintered body encompassing a sialon sintered body according to the present invention, the degree of orientation of the texture thereof on an arbitrary two-dimensional cross section of the formed sintered body in a direction parallel to the axial direction of tension or compression in the forming step is in the range of 5 to 80% in terms of the above-defined degree of orientation. When deformation is effected only to a degree of orientation of lower than 5%, the amount of deformation is excessively small to involve a poor formability. On the other hand, when deformation is effected until the degree of orientation exceeds 80%, the amount of deformation is so large as to lengthen the working time to an economic disadvantage.

Further, in the formed silicon nitride sintered body (encompassing the sialon sintered body) according to the present invention, the linear density of grains per 50 μm in length parallel to the axial direction of tension or perpendicular to the axial direction of compression in the above-mentioned two-dimensional cross section is in the range of 80 to 200. When the linear density is lower than 80, the mechanical properties such as strength after forming are notably deteriorated. On the other hand, when the linear density exceeds 200, the formed sintered body itself is lowered in mechanical strength to be undesirable as a part material. In the formed sintered body, the linear density is defined as the number of grains existing on a line of 50 μm in length parallel to the axial direction of tension or perpendicular to the axial direction of compression in an arbitrary two-dimensional cross section of the sintered body in a direction parallel to the axial direction of tension or compression.

Additionally stated, in order to obtain the formed silicon nitride (encompassing the sialon sintered body) as described above, it is important to select a sintered body having a linear density of 120 to 250 in terms of the number of grains as a sintered body before forming thereof. The term "linear density" as used herein means the number of grains 1 existing on an arbitrary line A of 50 μm in length in an arbitrary two-dimensional cross section of a sintered body as shown in FIG. 1. The fineness of a network structure constituted of grains and grain boundaries which a sintered body has is defined by this linear density.

When the linear density of the sintered body before forming thereof is lower than 120, application of the forming process of the present invention entails formation of cavities in the material attributable to slips in grain boundaries to cause breakage of the sintered body before the completion of forming thereof or notable deterioration of the mechanical properties, such as strength, of the material after forming thereof. On the other hand, when the linear density exceeds 250, the sintered body itself is lowered in mechanical strength to be undesirable for use as a material.

The formed silicon nitride sintered body, encompassing the formed sialon sintered body, preferably has the following crystalline phases in addition to the foregoing degree of orientation and linear density. Specifically, at least one of α-silicon nitride and α'-sialon and at least one of β-silicon nitride and β'-sialon are contained therein, while the peak intensity ratio of the crystalline phase of the former to the crystalline phase of the latter in an X-ray diffraction pattern is in the range, of 0:100 to 30:70. This is because a higher strength can be secured when the peak intensity ratio is in the above-specified range.

Herein, the α/β precipitation ratio is defined as the peak intensity ratio of diffraction lines (102)+(210) for (α-silicon nitride, α'-sialon) to diffraction lines (101)+(210) for (β-silicon nitride, β'-sialon). Specifically, calculation is made in terms of $\alpha\{(102)+(210)\}/[\alpha\{(102)+(210)\}+\beta\{(101)+(210)\}]$.

Additionally stated, in order to obtain the formed silicon nitride sintered body, encompassing the formed sialon sintered body, as described above, it is important not only that the grain structure of a sintered body before forming thereof have a linear density of 120 to 250 as specified above; but also (1) that the total cross-sectional area $\Sigma A_R$ of grains of at most 0.7 μm in grain size R in the directions of the major axes thereof on a two-dimensional cross section of the sintered body among silicon nitride grains as well as sialon grains constituting the sintered body before forming thereof accounts for at least 30% of the total cross-sectional area $\Sigma A$ of all grains, i.e., $\Sigma A_R/\Sigma A \geq 0.3$, and (2) that at least one of a-silicon nitride and α'-sialon and at least one of β-silicon nitride and β'-sialon are contained therein, while the peak intensity ratio of the crystalline phase of the former to the crystalline phase of the latter in an X-ray diffraction pattern is 1:99 to 60:40.

Herein, as shown in FIG. 2, the cross-sectional area of a grain is found through measurement of the grain size R in the direction of the major axis thereof as the maximum diameter of the grain 1 and grain size r in the direction of the minor axis thereof as the minimum diameter thereof in a two-dimensional cross section of a sintered body, and subsequent approximation of an ellipse with a major axis diameter R and a minor axis diameter r on the assumption that the shape of the grain is an ellipsoidal shape. The sum of the cross-sectional areas of all grains found in the foregoing manner is represented by $\Sigma A$, while the sum of the crosssectional areas of grains of at most 0.7 μm in grain size R among all the grains is represented by $\Sigma A_R$.

When a Vickers indenter is driven into a formed sintered body having the foregoing degree of orientation, linear density and crystalline phase proportion from above an arbitrary two-dimensional cross section thereof in a direction parallel to the axial direction of tension or compression in the forming step, the ratio of the length of a crack formed in the sintered body in a direction parallel to the axial direction of tension to that in a direction perpendicular thereto or the length of the crack in a direction perpendicular to the axial direction of compression to that in a direction parallel thereto is at least 1.2.

A method of finding this crack length ratio is as follows. After the vickers indenter is driven into the sintered body while bringing the arris of the indenter into line with the axis of tension or compression, the respective lengths of the resulting crack in directions parallel and perpendicular to the axial direction of tension or compression are measured, from which the crack length ratio is calculated. More specifically, after the Vickers indenter is driven into the sintered body from above the arbitrary two-dimensional cross section thereof parallel to the axial direction of tension or compression, the resulting crack is examined with respect to the respective lengths thereof in directions parallel and perpendicular to the axial direction of tension in the case of tension or the respective lengths thereof in directions perpendicular and parallel to the axial direction of compression in the case of compression, from which lengths the crack length ratio is calculated for the case of tension or compression.

As described hereinbefore, according to the present invention, a silicon nitride sintered body, encompassing a sialon sintered body, can be obtained, which has a degree of orientation of 5 to 80% as examined according to the method specified by Saltykov, a linear density of 80 to 200 in terms of the number of grains per 50 μm in length, and a bending strength of at least 80 kg/mm$^2$. However, the strength of the formed sintered body turns lower in some cases or higher the other way around in some other cases than the bending strength of a sintered body before forming thereof though it depends on forming conditions which will be described later. In order to secure a strength required of a sintered body fit for use, the forming conditions must be appropriately controlled within ranges which will be described later.

Next, the process for obtaining a silicon nitride sintered body and a sialon sintered body, according to the present invention will now be described. First, a silicon nitride (encompassing a sialon sintered body) having a linear density of 120 to 250 in terms of the number of grains per 50 μm in length in an arbitrary two-dimensional cross section of the sintered body and a relative density of at least 95%, preferably at least 96%, are used as a sintered body before forming thereof. The linear density is just as defined already. As described before, when the linear density is lower than 120, cavities are formed in the sintered body in the forming step. When the linear density exceeds 250, the formed sintered body is lowered in strength. On the other hand, a sintered body having a relative density of lower than 95% is not preferred because the sintered body itself is lowered not only in mechanical strength but also in superplastic workability.

The silicon nitride sintered body and the sialon sintered body having such a linear density and such a relative density are used for forming thereof through plastic deformation at a strain rate of at most 10$^{-1}$/sec under a tensile or compressive pressure at a temperature of 1,300° to 1,700° C. When the forming temperature is lower than 1,300° C., the forming speed is slowed down to lower the forming efficiency to an economic disadvantage. On the other hand, when the forming temperature exceeds 1,700° C., the physical or mechanical properties of the formed sintered body are lowered due to the thermal deterioration of the sintered body, volatilization of the grain boundary phase thereof, etc. Additionally stated, the preferred temperature is in the range of 1,350° to 1,650° C.

The forming pressure, which is applied by tension or compression, is appropriately controlled depending on the kind of sintered body prepared and the forming temperature in such a way as to provide a strain rate of at most 10$^{-1}$/sec. The reason for setting the strain rate at 10$^{-1}$/sec or lower is that cavities are formed in the sintered body at a strain rate exceeding 10$^{-1}$/sec during forming thereof, and then linked with each other to break the sintered body or lower the mechanical strength thereof. Additionally stated, the preferred strain rate is at most 10$^{-2}$/sec.

The forming atmosphere may be either a nonoxidizing atmosphere or a vacuum. Forming in an oxidizing atmosphere is not preferred because the silicon nitride sintered body is subject to surface oxidation in the above-specified temperature range to be gravely lowered in mechanical strength. Meanwhile, a jig to be used in forming is constituted of a heat-resistant material such as a ceramic, graphite or a heat-resistant alloy, which material may be appropriately selected depending on the forming temperature, the forming atmosphere, the forming time, etc.

According to the foregoing forming process, the silicon nitride sintered body and the sialon sintered body of the present invention subjected to plastic working can be obtained. According to this process, a maximum amount of deformation (amount of deformation at break through deformation) of at least 10% can be secured. Meanwhile, the sintered body before plastic working thereof, to which sintered body this forming process is applied, is preferably at least 130 kg/mm$^2$ in bending strength.

An example of the method of obtaining a formable silicon nitride sintered body capable of plastic deformation by virtue of the superplasticity thereof manifested in the foregoing process of the present invention is as follows. A silicon nitride powder of at most 1 μm in average particle size is used, and admixed with sintering additives capable of formina a liquid phase together with oxide layers made of SiO$_2$ and the like and existing in the surface portions of the powder at as low a temperature as possible, examples of which include Y$_2$O$_3$, Al$_2$O$_3$ and a Y- and Al-containing compound, and further with an Mg, Ce, Ca, La, Sr or like compound capable of forming a liquid phase together with a Y-Al component at a low temperature, followed by sintering the resulting powder at a sintering temperature of at most 1,700° C.

BEST MODES FOR CARRYING OUT THE INVENTION

Figure 1:
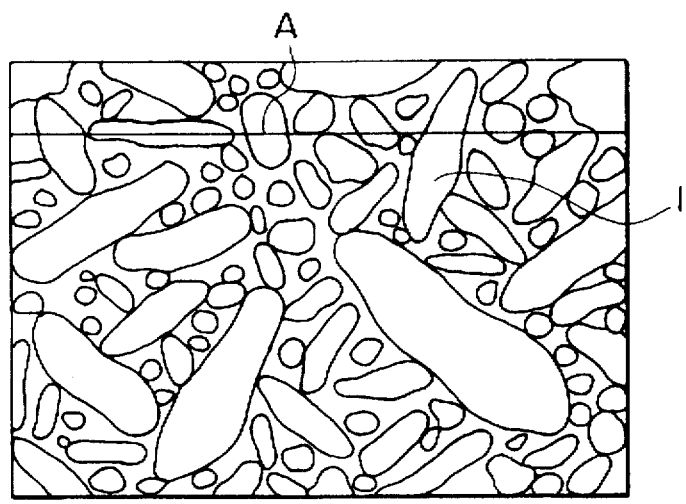
FIG. 1 is a schematic illustration of a cross section of a silicon nitride ceramic for explaining the definition of the linear density in the present invention.
Figure 2:
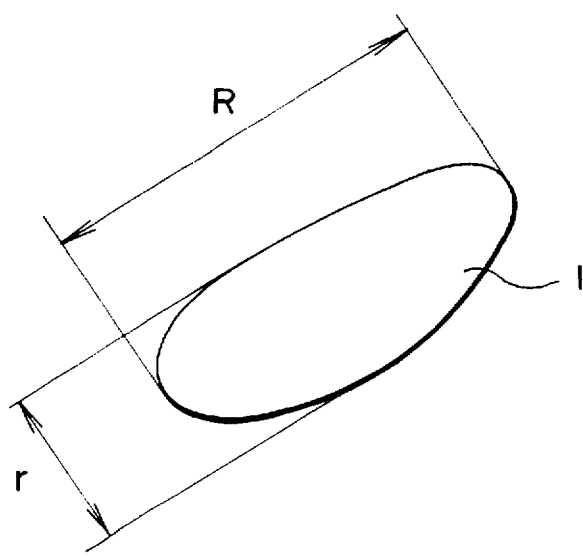
FIG. 2 is a schematic illustration of a silicon nitride grain for explaining the definition of the sizes of a grain in the direction of the major axis thereof R and in the direction of the minor axis thereof r in the present invention.

The following Examples will illustrate the present invention in more detail.

Example 1

An Si$_3$N$_4$ powder having an average particle size of 0.7 μm as measured using a particle size distribution determination apparatus and an α proportion of 90% was admixed with 5 wt. % of a Y$_2$O$_3$ powder, 3 wt. % of an Al$_2$O$_3$ powder and 1 wt. % of an MgO powder as sintering additives. They were mixed together in ethanol with a ball mill for 48 hours, followed by drying. The resulting mixed powder was pressed, subjected to CIP, and then sintered in an atmosphere of nitrogen gas at each of varied temperatures. Thus, a plurality of Si$_3$N$_4$ sintered bodies made up of Si$_3$N$_4$ grains and having a variety of linear density were obtained.

Part of a cross section of each sintered body thus obtained was chosen, finished to have a surface roughness R$_a$=0.02 μm, washed, and then etched in a mixed gas of O$_2$ and CHCl$_3$ (gas pressure: 40 mTorr) for 1 minute, using a reactive ion etching apparatus. The texture of the resulting two-dimensional cross section of the sintered body before forming thereof was observed with a scanning electron microscope to evaluate the linear density of grains, the cross-sectional area ratio of grains, and the $\alpha/(\alpha+\beta)$ ratio of crystalline phases according to the following procedures. The results are shown together with the relative density and bending strength at room temperature of each sintered body in Table 1.

Specifically, the linear density, which is defined as the number of grains counted on a line of 50 µm in length parallel to the direction of tension in a two-dimensional cross section, was examined in 5 portions per cross section for 5 cross sections to find the average value thereof. After the grain size R in major axis direction and cross-sectional area of every grain were measured, the cross-sectional area ratio was found as the ratio of the sum $\Sigma A_R$ of the cross-sectional areas of grains of at most 0.7 µm in size R to the sum $\Sigma A$ of the cross-sectional areas of all grains, i.e., $\Sigma A_R/\Sigma A$. The precipitation ratio of crystalline phases was calculated in terms of $\alpha\{(102)+(210)\}/[\alpha\{(102)+(210)\}+\beta\{(101)+(210)\}]$ from the peak intensity ratio of diffraction lines (102)+(210) for ($\alpha$-silicon nitride, $\alpha'$-sialon) to diffraction lines (101)+(210) for ($\beta$-silicon nitride, $\beta'$-sialon), which ratio was examined by X-ray diffractometry.

TABLE 1

Properties of Sintered Bodies before Forming Thereof

| Run No. | Linear Density (/50µ) | Cross-sectional Area Ratio (%) | $\alpha/(\alpha + \beta)$ (%) | Relative Density (%) | Bending Strength (kgf/mm$^2$) |
|---|---|---|---|---|---|
| 1* | 310 | 86 | 73 | 93 | 76 |
| 2* | 290 | 78 | 64 | 94 | 78 |
| 3 | 240 | 72 | 39 | 99 | 135 |
| 4 | 190 | 51 | 24 | 99 | 142 |
| 5 | 130 | 34 | 9 | 99 | 137 |
| 6* | 96 | 25 | 0 | 94 | 78 |

(Note) Samples with * in the Table are of comparative examples.

Subsequently, test pieces having a columnar portion of 3 mm in diameter and 10 mm in length were cut out from each sintered body, and then deformed by tension at a strain rate of 4×10$^{-5}$/sec in an atmosphere of nitrogen gas in a high-temperature oven set at 1,600° C. The formed sintered body test pieces were examined or observed with respect to the stress in the forming step, the maximum amount of deformation at break and the shape of deformation (necked or not necked), and the results are shown of each sintered body in Table 2.

TABLE 2

| Run No. | Stress in Forming Step (kgf/mm$^2$) | Maximum Amount of Deformation (%) | Shape of Deformation (necking) |
|---|---|---|---|
| 1* | 2.1 | 129 | no |
| 2* | 2.4 | 136 | no |
| 3 | 2.5 | 152 | no |
| 4 | 2.6 | 163 | no |
| 5 | 2.6 | 133 | no |
| 6* | 2.3 | 50 | no |

(Note) Samples with * in the Table are of comparative examples.

Example 2

The same Si$_3$N$_4$ powder as in Example 1 was used and sintered in substantially the same manner as in Example 1 to obtain a plurality of Si$_3$N$_4$ sintered bodies having a variety of linear density. Part of each sintered body thus obtained was finished to have a surface roughness R$_a$=0.02 µm, and then etched in substantially the same manner as in Example 1. Thereafter, the texture of it was observed with a scanning electron microscope to evaluate the linear density of grains, the cross-sectional area ratio of grains, and the $\alpha/(\alpha+\beta)$ ratio of crystalline phases in the same manner as in Example 1. The results are shown together with the relative density and flexural strength at room temperature of the sintered body in Table 3.

TABLE 3

Properties of Sintered Bodies before Forming Thereof

| Run No. | Linear Density (/50µ) | Cross-sectional Area Ratio (%) | $\alpha/(\alpha + \beta)$ (%) | Relative Density (%) | Bending Strength (kgf/mm$^2$) |
|---|---|---|---|---|---|
| 7* | 290 | 79 | 68 | 94 | 76 |
| 8 | 230 | 70 | 35 | 98 | 139 |
| 9 | 180 | 53 | 23 | 99 | 141 |
| 10* | 160 | 47 | 20 | 99 | 145 |
| 11 | 170 | 48 | 21 | 99 | 146 |
| 12 | 130 | 39 | 10 | 99 | 131 |
| 13* | 100 | 27 | 0 | 94 | 76 |
| 14 | 210 | 71 | 62 | 96 | 132 |

(Note) Samples with * in the Table are of comparative examples.

Subsequently, test pieces having a columnar portion of 6 mm in diameter and 30 mm in length were cut out from each sintered body, and then formed by tension at a strain rate of 4×10$^{-5}$/sec in an atmosphere of nitrogen gas in a high-temperature oven set at 1,600° C. in such a way as to provide respective amounts of deformation of 5%, 50% and 100% at the time of the completion of forming thereof. None of the samples were necked.

A two-dimensional cross section of each formed sintered body test piece, including the axis of tension, was finished to have a surface roughness R$_a$=0.02 µm, and then etched in substantially the same manner as in Example 1. Thereafter, the texture of it was observed at a magnification of 2,000 with a scanning electron microscope, and the degree of orientation thereof was calculated according to the method specified by Saltykov. Additionally stated, the degree of orientation, which was found for a unit length of 50 µm, was examined in 5 portions per cross section for 5 cross sections to find the average value thereof.

After a Vickers indenter was driven into the same cross section as mentioned above while bringing the arris of the indenter into line with the axis of tension, the respective lengths of the resulting crack in that cross section in directions parallel and perpendicular to the axial direction of tension were measured, from which the crack length ratio was calculated. A bending test piece of 3 mm in width, 3 mm in thickness and 20 mm in length was produced from each test piece, and the bending strength thereof at room temperature was measured. Further, each formed sintered body was evaluated with respect to the linear density of grains, the cross-sectional area ratio of grains, and the $\alpha/(\alpha+\beta)$ ratio of crystalline phases in the same manner as in Example 1. The results are shown in Table 4.

TABLE 4

| Run No. | Stress in Forming Step (kgf/mm²) | Amount of Deformation (%) | Degree of Orientation (%) | Linear Density (/50µ) | α/(α + β) (%) | Crack Length Ratio | Bending Strength (kgf/mm²) |
|---|---|---|---|---|---|---|---|
| 7* | 2.3 | 100 | 38 | 220 | 36 | 1.6 | 78 |
| 8 | 2.6 | 100 | 41 | 170 | 24 | 1.5 | 142 |
| 9 | 2.6 | 50 | 10 | 160 | 21 | 1.3 | 138 |
| 10* | 1.5 | 5 | 2 | 150 | 18 | 1.1 | 143 |
| 11 | 2.6 | 100 | 35 | 120 | 12 | 1.3 | 132 |
| 12 | 2.6 | 100 | 46 | 85 | 3 | 1.4 | 107 |
| 13* | 2.2 | 47 | 4 | 70 | 0 | 1.4 | 65 |
| 14 | 1.9 | 15 | 6 | 190 | 45 | 1.2 | 83 |

(Note)Samples with * in the Table are of comparative examples. Additionally stated, all the samples were not necked, and Sample No. 13 was broken when the amount of deformation thereof reached 47%.

Industrial Applicability

According to the present invention, a simple silicon nitride sintered body and sialon sintered body can be formed into a desired shape through plastic working thereof such as forging or pressing under a load of tension, compression or the like by making much of the superplasticity thereof, and the resulting formed sintered body having the desired shape still has substantially the same excellent mechanical properties especially at ordinary temperatures as before working thereof.

Accordingly, it is applicable to machine parts including a valve train of an internal combustion engine.

We claim:

1. A formed silicon nitride ceramic body having a degree of orientation of texture thereof on a two-dimensional cross section of the formed sintered body thereof in a direction parallel to axial direction of tension or compression in a forming step in the range of 5 to 80% as examined according to the equation specified by Saltykov $$\omega = 100 \times \{(NL)\perp - (NL)\|\}/\{(NL)\perp + 0.571 \times (NL)\|\}$$

wherein the unit of ω is percent (NL) ⊥ is the average number of points of intersection of a secant line perpendicular to the axis of tension with lines of grain boundaries per unit length, or the average number of points of intersection of a secant line parallel to the axis of compression with lines of grain boundaries per unit length, while (NL)∥ is the average number of points of intersection of a secant line parallel to the axis of tension with lines of grain boundaries per unit length, or the average number of points of intersection of a secant line perpendicular to the axis of compression with lines of grain boundaries per unit length and a linear density of grains per 50 µm in length in a direction parallel to the axial direction of tension or perpendicular to the axial direction of compression in said two-dimensional cross section 80 to 200.

2. A formed silicon nitride ceramic body as claimed in claim 1, wherein at least one of α-silicon nitride and α'-sialon and at least one of β-silicon nitride and β'-sialon are contained in said formed ceramic body thereof, with a peak intensity ratio of the crystalline phase of α-silicon nitride and α'-sialon to a crystalline phase of β-silicon nitride and β'-sialon in an X-ray diffraction pattern is in the range of 0:100 to 30:70.

3. A formed silicon nitride cermic body as claimed in claim 1 wherein when a Vickers indenter is driven into said formed sintered body thereof from above an arbitrary two-dimensional cross section thereof in a direction parallel to an axial direction of tension or compression in the forming step, the ratio of length of a resulting crack in a direction parallel to the axial direction of tension to that in a direction perpendicular thereto or length of said crack in a direction perpendicular to axial direction of compression to that in a direction parallel thereto is at least 1.2.

4. A formed silicon nitride ceramic body as claimed in claim 1 wherein bonding strength of said ceramic body thereof is at least 80 Kg/mm².

5. A process for forming a silicon nitride sintered body to obtain the formed sintered nitride ceramic body of claim 1, comprising forming a silicon nitride sintered body having a relative density of at least 95% and a linear density of 120 to 250 in terms of the number of grains per 50 µm in length in a two-dimensional cross section of said sintered body by plastic deformation thereof at a strain rate of at most $10^{-1}$/sec under a tensile or compressive pressure at a temperature of 1,300° to 1,700° C.

6. A process for forming a silicon nitride body as claimed in claim 5, characterized in that the maximum amount of deformation in the forming step is at least 10%.

7. A process for forming a silicon nitride body as claimed in claim 5, the strength of said sintered body before forming thereof is at least 130 kg/mm².

8. A process for forming a silicon nitride body as claimed in claim 5, wherein said sintered body before forming thereof is such that total cross-sectional area of grains of at most 0.7 µm in grain size in the directions of the major axes thereof on a two-dimensional cross section thereof among silicon nitride grains and sialon grains account for at least 30% of the total cross-sectional area of all grains, and that at least one of α-silicon nitride and α'-sialon and at least one of β-silicon nitride and β'-sialon are contained therein, while the peak intensity ratio of the crystalline phase of the former to the crystalline phase of the latter in an X-ray diffraction pattern is 1:99 to 60:40.

* * * * *